US007111594B2

(12) United States Patent
Mizuta et al.

(10) Patent No.: US 7,111,594 B2
(45) Date of Patent: Sep. 26, 2006

(54) METHOD OF OPERATING INTERNAL COMBUSTION ENGINE INCLUDING ELECTROMAGNETICALLY DRIVEN INTAKE VALVES

(75) Inventors: Tametoshi Mizuta, Susono (JP); Isao Matsumoto, Susono (JP); Kazuhiko Shiratani, Susono (JP); Shoji Katsumata, Gotemba (JP); Keiji Yoeda, Numazu (JP); Makoto Ogiso, Mishima (JP); Hideyuki Nishida, Suntou-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/488,616

(22) PCT Filed: Sep. 3, 2002

(86) PCT No.: PCT/IB02/03561

§ 371 (c)(1),
(2), (4) Date: Mar. 26, 2004

(87) PCT Pub. No.: WO03/021086

PCT Pub. Date: Mar. 13, 2003

(65) Prior Publication Data

US 2005/0016478 A1 Jan. 27, 2005

(30) Foreign Application Priority Data

Sep. 4, 2001 (JP) .............................. 2001-267686

(51) Int. Cl.
*F01L 9/04* (2006.01)

(52) U.S. Cl. ............................... 123/90.11; 123/90.15; 123/90.24; 123/674; 123/568.16; 60/900; 251/129.04; 251/129.18; 701/102; 701/105

(58) Field of Classification Search .. 123/90.11–90.12, 123/90.15–90.17, 306, 308, 478; 60/716, 60/900; 701/105
See application file for complete search history.

(56) References Cited

U.S. PATENT DOCUMENTS

| 5,103,779 | A | * | 4/1992 | Hare, Sr. .................. 123/90.11 |
| 5,752,478 | A | * | 5/1998 | Sono et al. ............... 123/90.11 |
| 5,765,514 | A | * | 6/1998 | Sono et al. ............... 123/90.11 |
| 5,992,153 | A | * | 11/1999 | Tsuchihashi et al. .......... 60/716 |
| 6,003,481 | A | * | 12/1999 | Pischinger et al. ...... 123/90.11 |
| 6,044,814 | A | * | 4/2000 | Fuwa ....................... 123/90.11 |
| 6,234,144 | B1 | * | 5/2001 | Yamaguchi et al. ......... 123/399 |
| 6,276,316 | B1 | * | 8/2001 | Arai et al. ............... 123/90.11 |
| 6,286,478 | B1 | | 9/2001 | Atago et al. |

(Continued)

FOREIGN PATENT DOCUMENTS

JP        11-280503        10/1999

(Continued)

*Primary Examiner*—Thomas Denion
*Assistant Examiner*—Kyle M. Riddle
(74) *Attorney, Agent, or Firm*—Oliff & Berridge PLC

(57) ABSTRACT

A method of operating an internal combustion engine having an; electromagnetically driven intake valves for a vehicle. With the method, deviation of an opening operation of the electromagnetically driven intake valve in response to a command signal for opening the intake valve from a predetermined characteristic is detected, and at least one of parameters used for controlling operation of the internal combustion engine is corrected so as to reduce a change in an intake air charging state in which the internal combustion engine is charge with the intake air. A valve closing timing of the intake valve or a valve closing timing of the exhaust valve that cooperates with the intake valve may be used as parameters to be corrected.

12 Claims, 3 Drawing Sheets

U.S. PATENT DOCUMENTS

| | | | |
|---|---|---|---|
| 6,343,577 B1 * | 2/2002 | Toriumi | 123/90.11 |
| 6,557,505 B1 * | 5/2003 | Hori | 123/90.11 |
| 2002/0056422 A1 | 5/2002 | Yamaki et al. | |

FOREIGN PATENT DOCUMENTS

| | | |
|---|---|---|
| JP | 2000-8895 | 1/2000 |
| JP | A 2000-45733 | 2/2000 |
| JP | A 2000-73800 | 3/2000 |
| JP | 2001-182570 | 7/2001 |
| JP | 2001-193504 | 7/2001 |

* cited by examiner

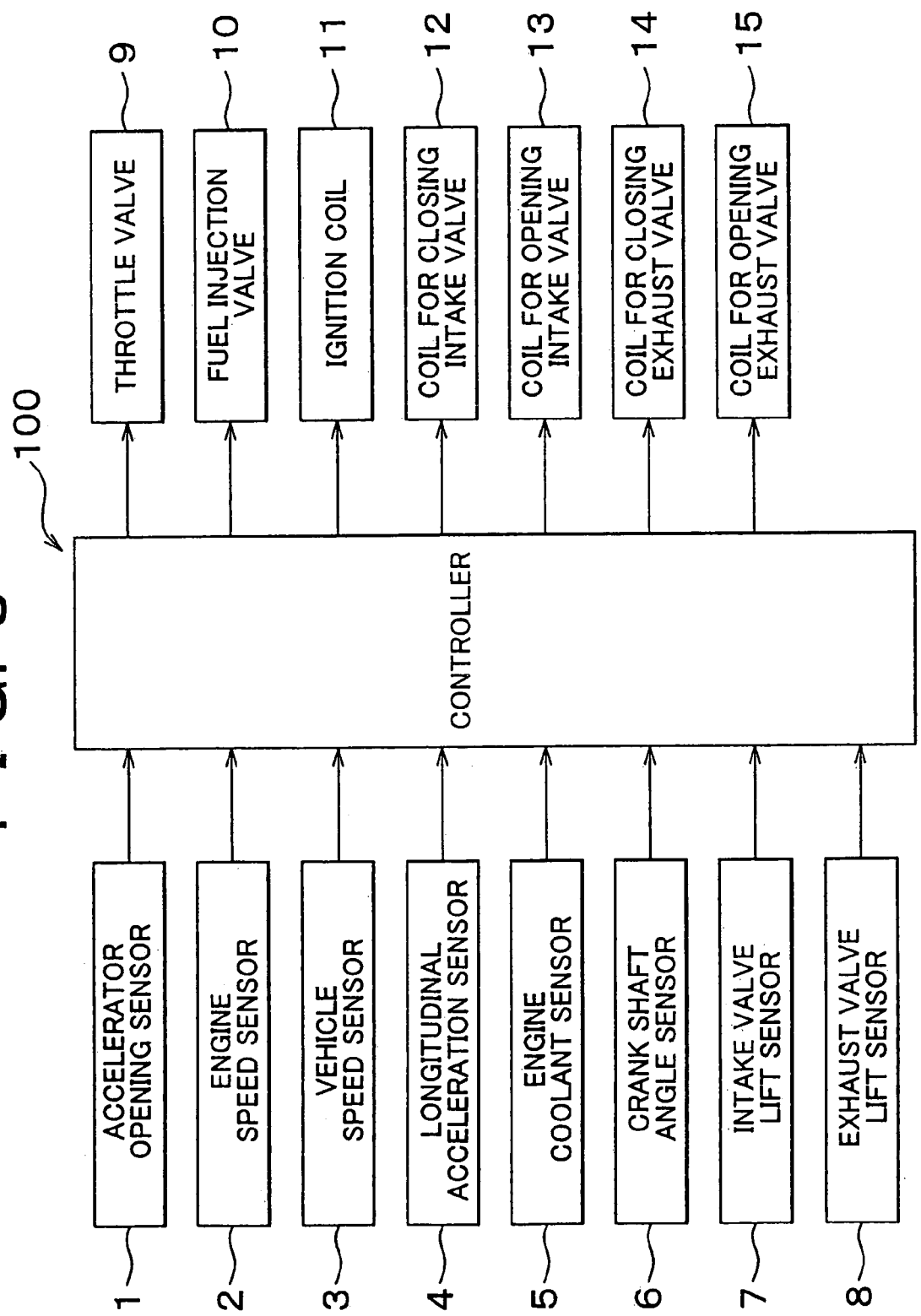

METHOD OF OPERATING INTERNAL COMBUSTION ENGINE INCLUDING ELECTROMAGNETICALLY DRIVEN INTAKE VALVES

BACKGROUND OF THE INVENTION

1. Field of Invention

The invention relates to a method of operating an internal combustion engine of a vehicle, and more particularly, to the method of operating an internal combustion engine having an electromagnetically driven intake valve.

2. Description of Related Art

Conventionally intake valves or exhaust valves of an internal combustion engine have been operated by a cam of a cam shaft that is driven by a crank shaft synchronously. Recent advancement in a control technology using a computer has allowed operation of the intake or exhaust valves by an electromagnetic actuator. The resultant expanded range of the valve operation timing makes it possible to control operation of the internal combustion engine especially for a vehicle in various modes. The aforementioned technology for controlling the operation is disclosed in JP-A-2000-73800, 2001-182570, and 2001-193504, for example.

FIG. 1 is a schematic cross sectional view of the electromagnetically driven intake valve that corresponds to the view shown in FIG. 2 of JP-A 2001-193504. Referring to FIG. 1, an intake port 26 has an open end around which a valve seat 200 is provided. The open end is opened and closed by a valve 28a of the intake valve. The valve 28a is connected to a valve shaft 28b that is vertically guided by bushing 201 so as to move up and down. The valve 28a is designed to move between a valve opening position and a valve closing position by an electromagnetic drive system 30.

The electromagnetic drive system 30 includes a housing 300, a valve closing core 301, a valve opening core 302, a valve closing coil 303, a valve opening coil 304, and an armature 305 that is carried by the valve shaft 28b and moves between a valve closing electromagnetic device having the valve closing core 301 and the valve closing coil 303 and a valve opening electromagnetic device having the valve opening core 302 and the valve opening coil 304. The electromagnetic drive system 30 further includes compression coil springs 306, 307 that serve to elastically bring the armature 305 into a center position between the electromagnetic devices when no electric current is applied to the coils 303 nor 304.

Referring to FIG. 1, an intake valve lift sensor 40 is directly assembled onto the electromagnetic drive system 30. The lift sensor 40 includes a housing 400 connected to the housing 300 of the electromagnetic drive system 30, a disc-like target 401 attached to the upper end of the valve shaft 28b within the housing 400, and a gap sensor 402 that is provided in the housing 400 so as to detect displacement of the target 401.

During operation of the internal combustion engine having the aforementioned electromagnetically driven intake valve, an appropriate electric controller switches supply of electricity between the valve closing coil and the valve opening coil in accordance with a rotating phase of the crank shaft of the engine. As a result, the intake port is closed by switching the supply of electricity to the intake valve closing coil 303. The intake port is opened by switching the supply of electricity to the intake valve opening coil 304.

In the electromagnetic drive system including the cores, coils, armature and springs, a positional deviation of the armature is not caused by the positional restriction, that is, contour of the cam in operation but caused by imbalance of the force. Accordingly opening and closing of the valve operated in response to the electric command signals that command opening and closing of the valve may deviate from a predetermined normal characteristic at every opening and closing valve operation in response to the electric command signals. The valve is tightly seated on the valve seat in the closed state in which friction force that is likely to disperse acts between the valve and the valve seat. Especially in the case where an annular shoulder portion of the intake valve or the exhaust valve of the internal combustion engine abuts on the annular valve seat along the respective center axes, the frictional force acting between the valve and the valve seat may vary depending on concentricity of those elements. The friction drag acting on the valve at a time when the valve is opened from the closed state may vary among a plurality of valves each being identically designed. Furthermore, the friction drag acting on the single valve may also vary at every opening and closing operation. As the timing for opening the intake valve is partially overlapped with the timing for closing the exhaust valve, a small difference in the valve opening characteristic may influence the operation performance of the engine after the air intake state has been changed. Even if the intake valve opening timing is slightly deviated from the control target value, the desired effect cannot be obtained in the control for operating the engine.

The deviation of the valve opening operation from the normal characteristic may also occur in the exhaust valve owing to dispersion in the friction of engagement between the valve and the valve seat. As the opening operation of the exhaust valve is not overlapped with the opening operation nor closing operation of the intake valve, the slight dispersion in the opening characteristics of the exhaust valve may be negligible in view of controlling the operation of the internal combustion engine.

SUMMARY OF THE INVENTION

It is an object of the invention to provide a method of operating an internal combustion engine including electromagnetically driven intake valves, that addresses the problem caused by dispersion in characteristics of the operation of the intake valve, especially the electromagnetically driven intake valve of the internal combustion engine.

According to an embodiment of the invention, a method of operating an internal combustion engine having an electromagnetically driven intake valve for a vehicle includes detecting deviation of an opening operation of the electromagnetically driven intake valve in response to a command signal for opening the intake valve from a predetermined characteristic, and correcting at least one of parameters used for controlling operation of the internal combustion engine so as to reduce a change in an intake air charging state in which the internal combustion engine is charged with the intake air.

A valve closing timing of the intake valve or the exhaust valve that cooperates with the intake valve may be used as a parameter to be corrected.

When the intake valve as the electromagnetically driven valve of the internal combustion engine is operated in response to the electric command signal, the intake valve is not always considered as being opened to coincide with the predetermined normal characteristic in response to the command signal. The actual opening operation of the intake valve is compared with the predetermined normal characteristic of the intake valve opening in response to the command signal so as to detect deviation from the normal characteristic. In order to reduce the change in the intake air charging state in which the internal combustion engine is charged with the intake air owing to the aforementioned deviation, at least one of parameters used for controlling operation of the internal combustion engine is corrected. This makes it possible to prevent the intake air charging state from deviating from a target value owing to deviation of the actual opening operation of the intake valve from the predetermined normal characteristic in response to the valve opening command signal. As a result, the desired effect of controlling the internal combustion engine can be obtained.

Assuming that at least one of parameters is a closing timing of the intake valve, correction of the closing timing of the intake valve may reduce the change in the intake air charging state caused by deviation of the actual opening operation of the intake valve from the normal characteristic. Assuming that at least one of parameters is a closing timing of the exhaust valve, correction of the closing timing of the exhaust valve may reduce the change in the air intake state caused by deviation of the actual opening operation of the intake valve from the normal characteristic.

BRIEF DESCRIPTION OF THE DRAWINGS

FIG. 3 is a view showing a control structure employed to implement the method of operating the internal combustion engine according to the invention.

DETAILED DESCRIPTION OF PREFERRED EMBODIMENTS

Figure 1:
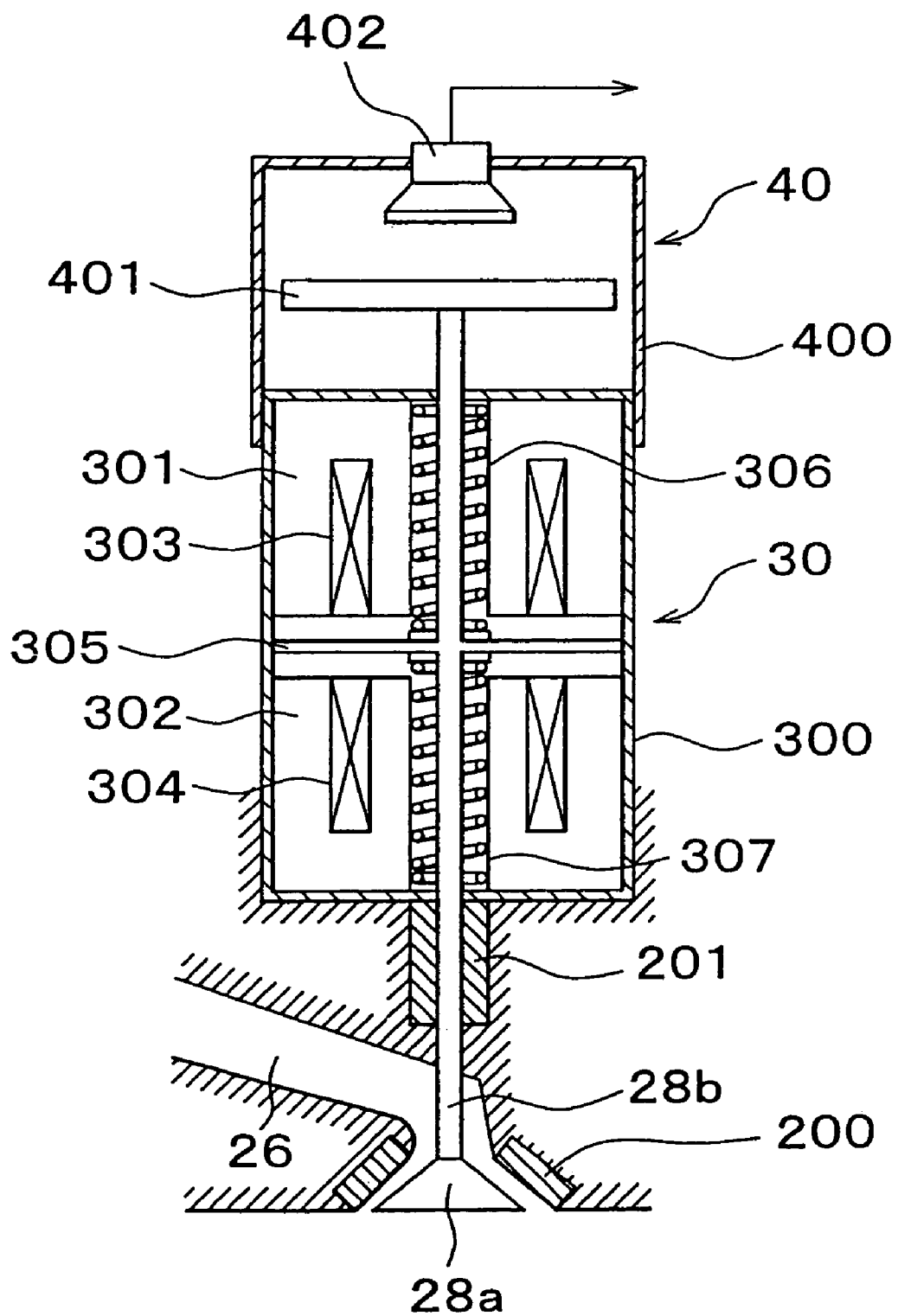
FIG. 1 is a sectional view of an example of an electrically driven intake valve and a lift sensor combined with the intake valve.
Figure 2:
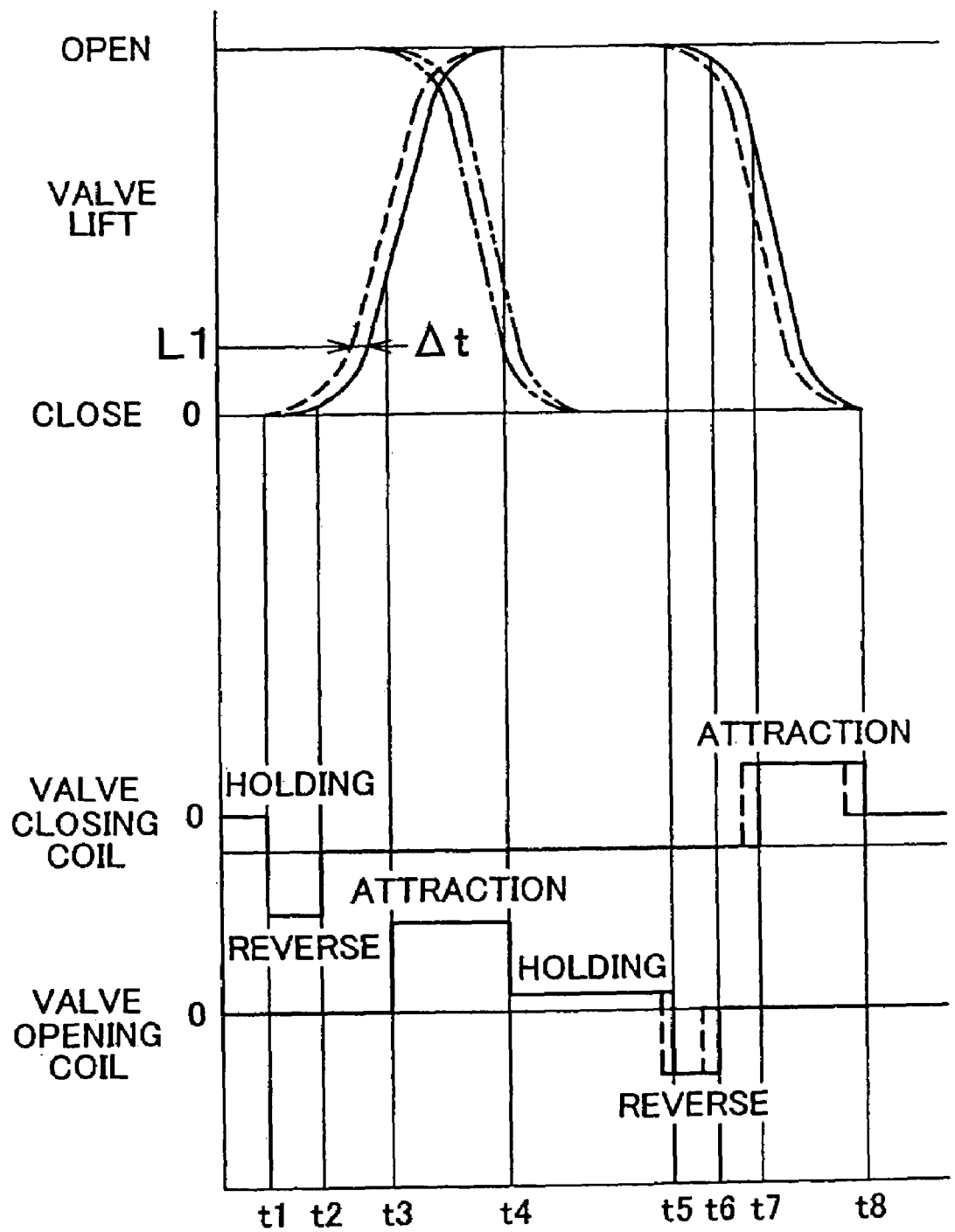
FIG. 2 is a time chart showing each state in which electricity is applied to coils for opening the valve and for closing the valve, and change in the valve lift amount of the intake valve in response to application of electricity to the coils for opening the valve and for closing the valve.

FIG. 2 is a time chart showing each state in which electricity is applied to coils for opening and closing the electromagnetically driven intake valve, and change in the valve lift amount of the intake valve as electricity is supplied to those coils. When the valve is closed, generally a holding electric current at a low level is applied to the coil for closing the valve so as to keep the valve closed. The electric current is cut at a time point t1 in order to open the valve, and the electric current is reversely applied to the valve closing coil for a short period until the time point t2 in order to release the valve from the closing position. The reversely applied electric current allows the armature to be easily apart from the electromagnetic device for closing the valve. Accordingly the valve is released from the valve seat that has been tightly engaged with the valve with friction. Then the valve, valve shaft and the armature are altogether forced to move toward a neutral position as shown in FIG. 1. At a time point t3 when electricity is applied to the coil for opening the valve, the armature proceeds to the valve opening direction passing over the neutral point. After passing over the neutral point, the armature is moved toward the electromagnetic device for opening the valve by the inertial force and electromagnetic attraction force against the return biasing force generated by the spring. At the time point t4, the valve is brought into a full opening position. The electric current applied to the coil for opening the valve is switched to the holding current at the low level so as to keep the valve in the open state and maintained until the time point t5.

When a valve closing command signal is issued at the time point t5, the current applied to the coil for opening the valve is cut, and current is reversely applied to the coil for opening the valve for a short period until the time point t6 so as to move the armature away from the state where the valve is opened. The armature then is moved by the spring force toward the neutral point. When electric current application to the coil for closing the valve is started at the time point t7, the armature attracted by the electromagnetic device for closing the valve passes over the neutral point. Then the armature reaches the full closing position of the valve at the time point t8 against the return force of the spring. Here the electric current applied to the coil for closing the valve is further reduced to the holding current at a low level to keep the valve closed.

Referring to the time chart shown in FIG. 2, the command signal to operate the intake valve is represented by solid lines indicating the level of the electric current applied to the coils for closing and opening the valve. Meanwhile, the normal characteristic of the operation for opening and closing the valve is represented by a solid line indicating the change in the valve lift amount. In the state where the valve is tightly seated on the valve seat, there is dispersion in the frictional resistance generated between the valve and the valve seat at the operation for opening the valve. Therefore, as shown by the dashed line of FIG. 2, the valve opening at the time point t1 to t4 in response to the same valve opening command signal may deviate from the normal characteristic curve. The deviation indicated by the dashed line of FIG. 2 is caused by the valve opening timing earlier than that of the normal characteristic when the holding electric current applied to the valve closing coil is cut and the electric current is reversely applied at the time point t1. The aforementioned deviation of the valve opening operation is determined by the difference in time period taken for release of the friction engagement between the valve and the valve seat. The time difference is represented by the time lag generated at a moment when the valve lift rises up from 0. Consequently with the low valve lift, for example, L1 or higher, the dashed line indicating the actual valve opening operation traces substantially the similar path of the solid line indicating the normal characteristic along the time axis with a certain lag of time. This is because the low lift state is hardly influenced by rise-up of the valve lift. Therefore deviation of the valve opening operation from the normal characteristic may be detected by obtaining a difference of time $\Delta t$ between the time when the valve lift amount reaches a predetermined value that passes over the initial rise-up value, for example, L1 and the time set by the normal characteristic.

The deviation as aforementioned is used for correcting a certain parameter that relates to control of operating the internal combustion engine. Therefore, such deviation is desired to be detected at a stage as early as possible. It is thus preferable to obtain the aforementioned deviation by comparing the time at which the predetermined low value of the valve lift, for example, L1 indicates a clear deviation with the corresponding time set by the normal characteristic.

The deviation of the valve opening operation owing to dispersion in the friction engagement between the valve and the valve seat traces substantially the similar path of the normal characteristic curve along the time axis with a certain lag of time. Accordingly the normal characteristic curve at the valve closing operation is shifted with respect to the time axis so as to keep the intake air charging state constant in spite of the deviation. Therefore, in the case where the timing for closing the intake valve is one of the parameters, such parameter is corrected by shifting the timing at which the valve closing command signal is issued to the intake valve.

The deviation in the operation for opening the exhaust valve that is electromagnetically driven may also be caused by the friction engagement between the valve and the valve seat. However, the opening operation of the exhaust valve is not overlapped with the operations for opening and closing the intake valve. The deviation in the valve opening operation of the exhaust valve can be negligible in view of control for operating the internal combustion engine. Meanwhile, the exhaust gas recirculation rate in the intake stroke can be controlled by adjusting the timing for closing the exhaust valve. This indicates that the deviation of the opening operation of the intake valve from the normal characteristic curve may be compensated by correcting the timing for closing the exhaust valve when the internal combustion engine is operated while recirculating the exhaust gas. Therefore, it is possible to use the timing for closing the exhaust valve as one of parameters to be corrected so as to cope with the deviation in the opening and closing operation of the intake valve from the normal characteristic curve.

Incorporation of the device for changing a valve lift amount of the intake valve into the electromagnetically driven valve as shown in FIG. 1 may correct the deviation of the opening and closing operation of the intake valve from the normal characteristic.

FIG. 3 shows elements that constitute the control structure used for implementing the method for operating the internal combustion engine according to the invention. The internal combustion engine is controlled by the apparatus for controlling operation of the vehicle. Referring to FIG. 3, a controller 100 having a micro-computer receives inputs of a signal indicating an accelerator opening amount sent from an accelerator opening sensor 1, a signal indicating an engine speed of the internal combustion engine sent from an engine speed sensor 2, a signal indicating a vehicle speed sent from a vehicle speed sensor 3, a signal indicating a longitudinal acceleration of the vehicle sent from a longitudinal acceleration sensor 4, a signal indicating a temperature of the internal combustion engine sent from an engine coolant temperature sensor 5, a signal indicating a rotational position of a crank shaft sent from a crank shaft angle sensor 6, a signal indicating an opening degree of the intake valve sent from an intake valve lift sensor 7 (40 in FIG. 1), and a signal indicating an opening degree of the exhaust valve sent from an exhaust valve lift sensor 8. The controller 100 controls a throttle valve 9 disposed in an intake passage of the internal combustion engine, a fuel injection valve 10 for injecting fuel into intake air in the internal combustion engine, an ignition coil 11 that actuates a spark plug, a coil 12 for closing the intake valve (corresponding to 303 in FIG. 1), a coil 13 for opening the intake valve (corresponding to 304 in FIG. 1), a coil 14 for closing the exhaust valve, and a coil 15 for opening the exhaust valve based on the received signals indicating operating conditions of the vehicle and the internal combustion engine so as to momentarily determine how the internal combustion engine is operated.

The intake valve is operated by the aforementioned control structure as shown in FIG. 2. The controller 100 operates calculation with respect to operation of the vehicle, that is, the internal combustion engine based on the operating state of the vehicle and the internal combustion engine represented by the signals sent from the sensors 1 to 8, and a control program or a control map installed in the controller 100. The controller 100 further transmits a control signal to operation elements such as the throttle valve 9 and the like at a cycle time of several tens milliseconds so as to control those elements.

The control method of operating the internal combustion engine of the invention controls such that the electric current is applied to the coils 12 and 13 for closing and opening the intake valve as shown by the solid line of FIG. 2. In the aforementioned method, the current applied to the coil 12 for closing the intake valve is switched from the holding current to the reversely applied current at the time point t1. The controller maintains this state until the time point t2. Then the controller detects the time point when the valve lift amount becomes L1 on the basis of the signal from the intake valve lift sensor 7. The detected time point is compared with the time point that is set to reach the valve lift L1 in accordance with the normal characteristics curve based on the time points t1 and t2 so as to calculate the time difference Δt.

The controller 100 performs the feedforward control using the obtained time difference so as to correct the time point t5 at which the holding current applied to the coil 13 for opening the intake valve is cut for closing the intake valve, and to correct the time point t6 at which reverse application of the current to the coil 13 is terminated as shown by the dashed line of FIG. 2 in accordance with the time difference. The controller 100 further corrects the time point t7 at which application of the current to the coil 12 for closing the intake valve is started and the time point t8 at which the application of the current to the coil 12 is terminated in accordance with the time difference as indicated by the dashed line of FIG. 2.

The time difference in the opening operation of the intake valve is compensated by correcting the closing operation of the exhaust valve during operation of the internal combustion engine in which the exhaust gas is recirculated. In the case where the opening operation of the intake valve occurs earlier than the timing set by the normal characteristic, the closing operation set by the normal characteristics curve is delayed as shown by the chain double-dashed line with respect to the actual valve closing of the exhaust valve as shown by the chain line of FIG. 2. By increasing amount of exhaust air compared with the intake air admitted into the cylinder chamber at the initial stage of the intake stroke, excessive admission of the intake air owing to earlier valve opening operation may be prevented even if the valve closing of the intake valve is operated in accordance with the normal characteristic curve.

As described above, it is clear for those who skilled in the art that it is possible to perform various modification including correction of the valve lift amount within the scope of the claim of the invention.

The invention claimed is:

1. A method of operating an internal combustion engine including an electromagnetically driven intake valve for a vehicle and an exhaust valve that is electromagnetically driven and that cooperates with a same combustion chamber as the intake valve, the method comprising the steps of:
   detecting deviation from a predetermined characteristic of an opening operation of the electromagnetically driven intake valve in response to a command signal for opening the intake valve; and
   adjusting at least one parameter used for controlling operation of the internal combustion engine so as to reduce a change in an intake air charging state in which the internal combustion engine is charged with the intake air, the change caused by the detected deviation from the predetermined characteristic, wherein the at least one parameter to be adjusted comprises a valve closing timing of the exhaust valve during operation of the internal combustion engine in a mode in which exhaust gas is recirculated through the internal combustion engine.

2. A method according to claim 1, wherein the at least one parameter to be adjusted further comprises a valve closing timing of the intake valve.

3. A method according to claim 1, wherein the at least one parameter to be adjusted further comprises a valve lift amount of the intake valve.

4. A method according to claim 1, wherein the deviation of the opening operation of the electromagnetically driven intake valve is detected when a valve lift amount of the intake valve reaches a predetermined value.

5. An internal combustion engine having an electromagnetically driven intake valve and an exhaust valve that is electromagnetically driven and that cooperates with a same combustion chamber as the intake valve, the internal combustion engine comprising a controller that:

detects deviation from a predetermined characteristic of an opening operation of the electromagnetically driven intake valve in response to a command signal for opening the intake valve; and adjusts at least one parameter used for controlling operation of the internal combustion engine so as to reduce a change in an intake air charging state in which the internal combustion engine is charged with the intake air, the change caused by the detected deviation from the predetermined characteristic, wherein the at least one parameter to be adjusted comprises a valve closing timing of the exhaust valve during operation of the internal combustion engine in a mode in which exhaust gas is recirculated through the internal combustion engine.

6. An internal combustion engine according to claim 5, wherein the at least one parameter to be adjusted further comprises a valve closing timing of the intake valve.

7. An internal combustion engine according to claim 5, wherein the at least one parameter to be adjusted further comprises a valve lift amount of the intake valve.

8. An internal combustion engine according to claim 5, wherein the deviation of the opening operation of the electromagnetically driven intake valve is detected when a valve lift amount of the intake valve reaches a predetermined value.

9. An internal combustion engine comprising:

an electromagnetically driven intake valve;

an exhaust valve that is electromagnetically driven and that cooperates with a same combustion chamber as the intake valve; and a controller that:

determines an actual characteristic of an opening operation of the electromagnetically driven intake valve in response to a command signal for opening the intake valve;

compares the actual characteristic with a predetermined characteristic in order to determine a deviation between the actual and predetermined characteristics, the deviation causing a change in an intake air charging state in which the internal combustion engine is charged with the intake air; and adjusts at least one parameter used for controlling operation of the internal combustion engine so as to reduce the change in the intake air charging state that otherwise would occur due to the deviation, wherein the at least one parameter to be adjusted comprises a valve closing timing of the exhaust valve during operation of the internal combustion engine in a mode in which exhaust gas is recirculated through the internal combustion engine.

10. An internal combustion engine according to claim 9, wherein the at least one parameter to be adjusted further comprises a valve closing timing of the intake valve.

11. An internal combustion engine according to claim 9, wherein the at least one parameter to be adjusted further comprises a valve lift amount of the intake valve.

12. An internal combustion engine according to claim 9, wherein the deviation is determined when a valve lift amount of the intake valve reaches a predetermined value.

* * * * *